3,309,367
DERIVATIVES OF BENZAMIDOBENZANILIDE
Rudolf Hirt, Muri, near Bern, Switzerland, assignor to Dr. A. Wander, S.A., Bern, Switzerland, a corporation of Switzerland
No Drawing. Filed Feb. 7, 1964, Ser. No. 343,200
Claims priority, application Switzerland, Feb. 15, 1963, 1,903/63
4 Claims. (Cl. 260—256.4)

This invention is generally concerned with polybasic compounds and more specifically with new benzamidobenzanilide derivatives of the general formula:

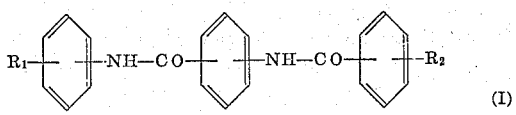

(I)

as well as acid addition salts thereof. In Formula I, $R_1$ and $R_2$ are the same or different basic residues of the

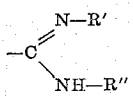

wherein R' and R" are the same or different and denote hydrogen atoms or straight or branched alkyl or alkoxyalkyl residues with not more than 5 carbon atoms, or wherein R' and R" together represent ethylene or propylene, wherein individual hydrogen atoms can be replaced by alkyl residues with all together not more than 4 carbon atoms.

The said products are obtained in the usual way by reacting an amine of the formula:

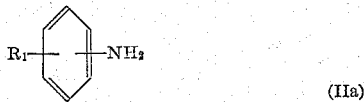

(IIa)

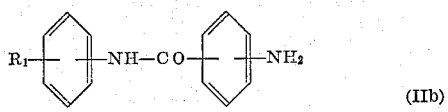

(IIb)

or an addition salt thereof, with a carboxylic acid of the formula:

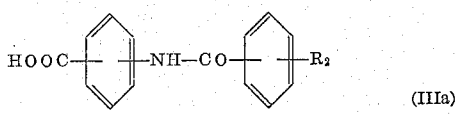

(IIIa)

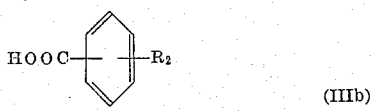

(IIIb)

or a reactive derivative, especially the anhydride, halide, ester or thio ester thereof, one of both reactants containing one phenylene residue, and the other containing two phenylene residues. The reaction is suitably carried out in a solvent, like dioxan, chloroform or an alcohol, at room temperature to reflux temperature. If one sets out from the free carboxylic acid, the reaction is aided by the addition of a condensing agent, especially a carbodiimide like dicyclohexylcarbodiimide. If the amine is used in the form of an addition salt, e.g. as hydrochloride, the reaction is preferably carried out in the presence of an acid-binding base, like pyridine, which can also serve as a solvent. From the reaction mixture the desired product is isolated, for example, by evaporating, taking up the residue in a suitable solvent and adding aqueous alkali metal hydroxide. By treating with an acid the resulting base can, if desired, be converted into an acid addition salt.

The starting compound of Formula IIb is obtained, for example, by condensing an amine according to Formula IIa with a nitrobenzoic acid chloride and reducing the nitro residue to the amino residue.

Compounds according to Formula I can also be produced by using in the reaction described above such starting materials as show in place of the basic residues $R_1$ and/or $R_2$, nitrile residues which subsequently can be converted by known processes into the basic residues $R_1$ or $R_2$ respectively, for instance, by treatment first with hydrogen sulphide or alcoholic hydrochloric acid, and then with an amine of the formula $H_2N—R'$ or

For example, the mono- or dinitrile obtained during condensation is dissolved in dimethylformamide and hydrogen sulphide gas is passed through the solution in the presence of a strong base like piperidine or triethylamine, at room temperature. The resulting thioamide can be precipitated with water and heated without adding any solvent and with an excess of the desired amine or diamine to approximately 110° C. The products are isolated in the usual way.

The method involving the dinitrile or one of the two mononitriles is always to be preferred when side-reactions of the basic residues $R_1$ or $R_2$ are likely to occur during condensation of the amines IIa or IIb with the carboxylic acids IIIa or IIIb or their derivatives or during manufacture of these starting substances.

The compounds according to Formula I can be obtained as free bases or in the form of their salts with inorganic or organic acids. As salts of the bases according to Formula I let me mention those of sulphuric, hydrochloric, hydrobromic, hydriodic, phosphoric, formic, acetic, propionic, butyric, tartaric, maleic, oxalic, citric, salicylic, or methane sulfonic acid and the like. The salts of the hydroxycarboxylic, ketocarboxylic and aminocarboxylic acids and especially the salts of glycolic, lactic, saccharic, mucic, ascorbic, heptagluconic, galactosidogluconic, galactosido-heptagluconic, laevulinic and glutamic acid are characterized by their particularly good solubility.

The polybasic compounds and their salts obtained in the way described above are new compounds which show biological actions. They have a strong growth-inhibiting action on various bacteria and protozoa, especially trypanosomes, and therefore can be used as chemotherapeutic agents. Lastly they can also be used as intermediate products for the manufacture of other, especially pharmacologically active compounds.

For chemotherapeutic purposes, especially for the treatment of trypanosomal infections other pharmaceutical forms and modes of administration are also suitable. Besides solutions or suspensions preparations in the form of powder or ointment, containing the usual vehicles and excipients, can also be considered for such purposes.

*Example 1*

4-nitro-4'-cyanobenzanilide obtained by condensation of p-aminobenzonitrile with p-nitrobenzoic acid chloride is hydrogenated catalytically to 4-amino-4'-cyanobenzanilide, which is condensed with p-cyanobenzoic acid chloride to 4'-cyano-4-(p-cyanobenzamido)benzanilide.

Hydrogen sulphide gas is passed through a suspension of 110 gm. of this dinitrile of melting point 320 to 325° C. in a mixture of 110 ml. of piperidine and 330 ml. of dimethylformamide, while cooling, at a temperature not exceeding 50° C. A clear solution is formed, from which a yellow solid separates out. The supply of hydrogen sulphide is interrupted after an hour and the reaction mixture is allowed to stand overnight. After cooling to 0° C. the yellow solid is isolated by filtration, washed with dimethylformamide, dimethylformamide/methanol and methanol and dried in vacuo. There are obtained 123 gm. of 4'-thiocarbamoyl-4-(p-thiocarbamoyl-benzamido) benzanilide of melting point 328° C. (decomposition).

106 gm. of the dithioamide thus obtained are added to 300 gm. of 1,3-diaminopropane and the mixture is heated slowly on a steam bath. After heating for 3 hours 300 ml. of methanol are added and the whole is boiled for another hour under moderate reflux. Then the reaction mixture is mixed with 2 litres of water, the precipitated solid is isolated by filtration and washed with water, methanol and again with water. The solid is suspended in a mixture of 2 litres of water and 150 gm. of lactic acid. The suspension is boiled up to remove sulphur, filtered with charcoal and reboiled for a short time until no more hydrogen sulphide is generated. It is filtered hot at 70° C., and to the clear, hot filtrate is added a solution of 200 gm. of sodium chloride in 500 ml. of water, whereupon a precipitate is immediately formed. After allowing to stand overnight the precipitate is isolated by filtration, washed with water and ethanol and dried in vacuo.

For further purification the product is dissolved in 1 litre of 80% formic acid at 70° C., filtered and the filtrate is mixed at 60° C. with 400 ml. of absolute ethanol and 100 ml. of ethanolic hydrochloric acid. The resulting precipitate is isolated by filtration after being allowed to stand overnight at 0° C., washed with absolute ethanol and ether and dried in vacuo at 40° C. over sodium hydroxide to constant weight. There are obtained 123 gm. of 4' - (1,4,5,6 - tetrahydro - 2 - pyrimidinyl) - 4 - (p-[1,4,5,6 - tetrahydro - 2 - pyrimidinyl]benzamido)benzanilide dihydrochloride, which shows a brown colouration from 400° C.

*Example 2*

8.0 gm. of the same dithioamide obtained in the same way as in Example 1 are mixed with 30 ml. of ethylenediamine and warmed for 3 hours on a steam bath. Then methanol is added to the reaction mixture, the precipitated solid is isolated by filtration, dissolved hot in a mixture of water and propionic acid, the hot solution is filtered after 1 hour with charcoal and the hot filtrate is mixed with aqueous sodium chloride solution. The precipitated pale yellow solid is isolated at 30° C. by filtration, washed with water, acetone and ether and dried in vacuo. There are obtained 8.8 gm. of 4'-(2-imidazolin-2-yl)-4-(p-[2-imidazolin-2-yl]-benzamido)benzanilide dihydrochloride, which shows a brown colouration from 380° C.

*Example 3*

10.0 gm. of the same dithioamide obtained in the same way as in Example 1 are heated on a steam bath with 20 gm. of 1,2-diaminopropane. The reaction mixture is processed in the same way as in Example 1. There are obtained 6.0 gm. of 4'-(4[or 5]-methyl-2-imidazolin-2-yl)-4-(p-[4(or 5)-methyl-2-imidazolin-2-yl]benzamido) benzanilide dihydrochloride of melting point 355° C. (decomposition).

*Example 4*

3-nitro-4'-cyanobenzanilide obtained by condensation of p-aminobenzonitrile with m-nitrobenzoic acid chloride is hydrogenated catalytically to 3-amino-4'-cyanobenzanilide, which is condensed with p-cyanobenzoic acid chloride to 4'-cyano-3-(p-cyanobenzamido)-benzanilide.

Hydrogen sulphide gas is passed for half an hour through a suspension of 35 gm. of this dinitrile (melting point 285° C.) in a mixture of 40 ml. of piperidine and 120 ml. of dimethylformamide. The resulting clear solution is allowed to stand overnight and then diluted with water. The precipitated solid is isolated by filtration, washed successively with water, diluted acetic acid, water, methanol and ether and dried in vacuo. There are obtained 41 gm. of 4'-thiocarbamoyl-3-(p-thiocarbamoyl-benzamido)benzanilide of the melting point 240° C. (decomposition).

11 gm. of this dithioamide are mixed with 20 gm. of 1,2-diaminopropane and warmed for 1 hour on a steam bath. Then the reaction mixture is mixed with water, filtered to isolate the resulting solid, the latter is washed with water and dissolved in a boiling mixture of water and lactic acid. The hot solution is filtered with charcoal and concentrated aqueous ammonia solution is added to the filtrate, whereupon a solid separates out. The latter is isolated by filtration, washed with water and dried over sodium hydroxide in vacuo. The base thus obtained is dissolved in a litle absolute ethanol, and to the solution are added 20 ml. of ethanolic hydrochloric acid and then also ether. The precipitated solid is isolated by filtration, washed with acetone and ether and dried in vacuo. There are obtained 13 gm. of 4'-(4[or 5]-methyl-2-imidazolin-2-yl)-3-(p-[4(or 5)-methyl-2-imidazolin-2-yl]benzamido)benzanilide dihydrochloride of melting point 255 to 265° C. (decomposition).

*Example 5*

15 gm. of the same dithioamide obtained in the same way as in Example 4 are mixed with 30 ml. of 1,3-diaminopropane and warmed for 1 hour on a steam bath. Water is then added to the reaction mixture, whereupon a solid separates out, which is isolated by filtration, washed with water and dissolved in a boiling mixture of water and lactic acid. The hot solution is filtered with charcoal and 10% hydrochloric acid is added to the clear filtrate when hot. A solid is thereby precipitated, which is isolated at 50° C. by filtration, washed with diluted hydrochloric acid, acetone and ether and dried in vacuo. There are obtained 19 gm. of 4'-(1,4,5,6-tetrahydro-2-pyrimidinyl) - 3 - (p - [1,4,5,6 - tetrahydro - 2 - pyrimidinyl]benzamido)benzanilide dihydrochloride of melting point 295° C. (decomposition).

*Example 6*

6 gm. of the same dithioamide obtained in the same way as in Example 4 are warmed with 25 gm. of ethylenediamine for 4 hours on a water bath. The reaction mixture is diluted with methanol. The precipitated solid is isolated by filtration and dissolved in hot, diluted acetic acid. The solution is filtered when hot and hot, 10% sodium chloride solution is added till it becomes turbid. After cooling the precipitated solid is isolated by filtration, washed with sodium chloride solution and 1% hydrochloric acid and dried. There are obtained 5.5 gm. of 4' - (2 - imidazolin - 2 - yl) - 3 - (p - [2 - imidazolin-2-yl]benzamido)benzanilide dihydrochloride of melting point 275° C. (decomposition).

*Example 7*

4-amino-3'-cyanobenzanilide obtained by condensation of m-aminobenzonitrile with p-nitrobenzoic acid chloride is hydrogenated catalytically to 4-amino-3'-cyanobenzanilide, which is condensed with p-cyanobenzoic acid chloride to 3'-cyano-4-(p-cyanobenzamido)-benzanilide.

Hydrogen sulphide gas is passed for half an hour through a suspension of 5.0 gm. of this dinitrile of melting point 265 to 272° C. in a mixture of 10 ml. of piperidine and 30 ml. of dimethyl-formamide. The reaction mixture is allowed to stand overnight and then diluted with water. The precipitated solid is isolated by filtration, washed with water, diluted acetic acid, methanol and ether and dried in vacuo. There are obtained 5.7 gm. of 3'-thiocarbamoyl-4-(p-thiocarbamoyl-benzamido) benzanilide of melting point 265° C. (decomposition).

5.7 gm. of this dithioamide are mixed with 20 ml. of ethylenediamine and warmed on a steam bath. After 2 hours the reaction mixture is diluted with methanol and water, filtered to isolate the solid formed, the latter is washed till neutral and dissolved in a hot mixture of 100 ml. of water and 10 ml. of lactic acid. The hot solution is filtered with charcoal and mixed with 12 ml. of concentrated hydrochloric acid. A solid is precipitated, which after being allowed to stand overnight at 0° C. is isolated by filtration, washed with diluted hydrochloric acid, acetone and ether and dried in vacuo. For further purification the product is dissolved in hot methanol/water (9:1), the solution is mixed with hydrochloric ethanol, boiled for 10 minutes, filtered with charcoal and the filtrate is diluted with an equal volume of acetone. The resulting precipated crystalline solid is isolated by filtration after being allowed to stand at 0° C., washed with acetone and ether and dried. There are obtained 7.0 gm. of 3'-(2-imidazolin-2-yl)-4-(p-[2-imidazolin-2-yl]-benzamido)benzanilide dihydrochloride of melting point 292° C. (decomposition).

*Preparation of solutions for infusion*

The following ingredients are mixed together and agitated until a clear solution is obtained:

| | |
|---|---|
| 4' - (1,4,5,6 - tetrahydro - 2 - pyrimidinyl) - 4 - (p-[1,4,5,6 - tetrahydro - 2 - pyrimidinyl] - benzamido)benzanilide dihydrochloride _____gm____ | 0.1 |
| Dextrose _____gm____ | 50 |
| Bidistilled water _____gm____ | 1000 |

After filtration to remove any remaining solid particles, the solution is heated at 120° C. during 30 minutes and then kept under sterile conditions in a vessel suitable for making infusions.

I claim:

1. A member of the class consisting of (A) benzamidobenzanilide derivatives of the formula:

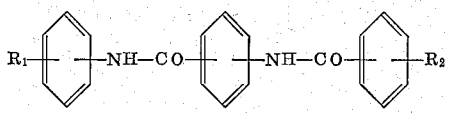

wherein $R_1$ and $R_2$ are the basic residues of the formula

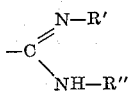

R' and R" representing, when R' and R" are taken together a member of the group consisting of ethylene, propylene, and ethylene and propylene wherein at least one hydrogen atom thereof is replaced by lower alkyl and thereby adding a total of not more than 4 carbon atoms to said ethylene and propylene; and (B) therapeutically useful acid addition salts of (A).

2. 4' - (1,4,5,6-tetrahydro - 2 - pyrimidinyl) - 4 - (p-[1,4,5,6-tetrahydro - 2 - pyrimidinyl]benzamido)benzanilide.

3. 4' - (4 - methyl - 2 - imidazolin - 2 - yl) - 4 - (p-[4 - methyl - 2 - imidazolin - 2 - yl]benzamido)benzanilide.

4. 4' - (5 - methyl - 2 - imidazolin - 2 - yl) - 4 - (p-[5 - methyl - 2 - imidazolin - 2 - yl]benzamido)benzanilide.

References Cited by the Examiner

Burger: Medicinal Chemistry, 2nd ed., Interscience, Publishers, Inc., New York, 1960, pp. 997–999.

Dorland's Illustrated Medical Dictionary, 23rd ed., W. B. Saunders Co., Philadelphia, 1957, pp. 229–230, 745, 1209–1210, and 1473–1474.

ALEX MAZEL, *Primary Examiner.*

HENRY R. JILES, *Examiner.*

MARY O'BRIEN, *Assistant Examiner.*